United States Patent Office 3,248,415
Patented Apr. 26, 1966

3,248,415
METHOD OF PREPARING HIGH MOLECULAR WEIGHT POLYCARBONATES
Henry C. Stevens, Akron, Ohio, assignor to Pittsburgh Plate Glass Company, Pittsburgh, Pa., a corporation of Pennsylvania
No Drawing. Continuation of application Ser. No. 758,613, Sept. 2, 1958. This application Jan. 16, 1963, Ser. No. 251,770
10 Claims. (Cl. 260—463)

This application is a continuation of application Serial No. 758,613, filed September 2, 1958, now abandoned, which application is a continuation-in-part of my application Serial No. 614,069, filed October 5, 1956, now abandoned.

The present invention deals with a novel process for manufacturing high molecular weight polycarbonates from carbon dioxide and 1,2 epoxides.

According to this invention, carbon dioxide and a 1,2 epoxide such as ethylene oxide are copolymerized to yield polycarbonates of 700 to 5000 molecular weight. It now has been discovered that this copolymerization occurs by virtue of the presence of a small controlled concentration of an organic compound having at least 2, usually 2 to 4, active hydrogens such as a polyhydric alcohol, e.g. ethylene glycol, at elevated temperature, superatmospheric pressure and preferably under conditions of base catalysis.

In accordance herewith, high molecular polycarbonates are prepared by subjecting in a closed system a mixture of an acylic 1,2 epoxide, carbon dioxide and a polyhydric alcohol (or like organic compound having 2 or more active hydrogens) containing 1 to 6 moles of 1,2 epoxide pore mole of carbon dioxide and from 0.01 to 0.20 moles and preferably 0.02 to 0.1 mole of polyhydric alcohol per mole of 1,2 epoxide to temperatures above 100° C. and superatmospheric pressures, preferably with a base catalyst present. Under such conditions, copolymerization occurs and from 2 to 10 moles of 1,2 epoxide per mole of carbon dioxide are consumed in the formation of high molecular weight polycarbonate.

These polycarbonates are usually terminated with hydroxyl groups, generally are between 700 and 2000 molecular weight and have hydroxyl numbers of 55 to 170. Polycarbonates with molecular weights of as high as 5000 and hydroxyl numbers as low as 20 or 25 may also be prepared.

A typical polycarbonate hereby provided using ethylene oxide as the 1,2 epoxide may be represented by this structural formula:

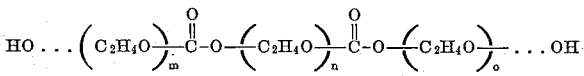

wherein subscripts m, n, o, etc. are positive whole integers of 1 or more. The repeating polyethylene oxide units $(CH_2-CH_2-O)$ may vary in length. Hence, subscripts m, n, o, etc. may represent different whole positive integers of 1 or greater. Usually, these repeating units are such that the subscripts are no greater than 8. The number of carbonate units,

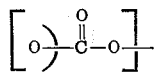

in these polycarbonate range from 2 to 20, more usually however the molecule has from 3 to 10 such units. With a different 1,2 epoxide, the repeating units separated by carbonate groups will correspond to ethers and polyethers of the epoxide.

Most high molecular weight polycarbonates hereby prepared vary in color from light to dark amber. They are generally rather viscous syrupy liquids although some are waxy solids.

In a typical performance of the invention, carbon dioxide and ethylene oxide or other acyclic 1,2 epoxide are charged to a reaction vessel designed to withstand elevated pressure, e.g. an autoclave, in the ratio of 1 to 6 moles of ethylene oxide per mole of carbon dioxide. A polyhydric alcohol such as diethylene glycol is charged in an amount sufficient to provide between 0.01 to 0.2 mole, and preferably 0.02 to 0.1 mole thereof per mole of ethylene oxide. A catalytic concentration, say 0.01 to 2.0 percent by weight of the charge, of a base catalyst, notably potassium carbonate, is included. With the reaction vessel sealed, the contents are raised above 100° C. and generally to 150° C. to 200° C. by heating. Superatmospheric pressures are developed of 200 to 2000, or even substantially higher, e.g. 5000, pounds per square inch at the outset. Under these conditions, copolymerization occurs and high molecular weight polycarbonate is produced.

Both ethylene oxide and carbon dioxide are gases under the temperature conditions of reaction. In a closed reaction vessel, the autogenous pressures initially developed provide adequate superatmospheric pressure. As will hereinafter be more fully explained various pressure conditions are encountered.

As the reaction ocurs and gaseous reactants are consumed, a decline in the pressure within the reaction vessel is experienced during the initial stages. This is because the high molecular weight polycarbonates are essentially non-volatile at these temperatures. Hence, as polycarbonates are formed, pressures in the autoclave drop, sometimes even to atmospheric pressure. High molecular weight polycarbonate may be recovered from the reaction mixture in the autoclave at this point.

According to a further embodiment hereof, an increased yield of high molecular weight polycarbonate may be obtained by continuing to subject the autoclave contents to the conditions prevailing after the drop in pressure. Thus, while good polycarbonate yields are realized when the pressure has declined to a minimum or near minimum, substantially higher yields have been obtained by continued treatment. During the continued treatment, the autogenous pressure builds up somewhat from the minimum pressure.

Continuous operation of the process is conducted by establishing set pressure and temperature conditions in a reaction zone. Thus, the zone is at a temperature between 100° C. to 250° C. and at a superatmospheric pressure of 200 pounds per square inch gauge to 2000 pounds per square inch gauge. Ethylene oxide and carbon dioxide are continuously or intermittently fed in the desired mole ratio, along with the specified ratio of polyhydric alcohol. Catalyst may be periodically or continually charged. Continuously withdrawn from the reactor is a composition corresponding to that provided by the equilibrium conditions established in the zone. Besides the desired polycarbonate, this composition may include unreacted ethylene oxide and carbon dioxide. These unreacted materials may be separated as by vacuum distillation and recycled as a portion of the feed.

A by-product which is frequently present along with high molecular weight polycarbonates produced hereby is ethylene carbonate. As described in my copending application Serial No. 614,070, filed October 5, 1956, now abandoned ethylene carbonate may be reacted with ethylene oxide to form high molecular weight polycarbonates. In operation of the herein contemplated process, ethylene carbonate may be recycled in admixture with carbon dioxide and ethylene oxide. The process, accordingly, provides for forming polycarbonates from ethylene oxide and carbon dioxide with ethylene carbonate present.

Temperatures for conducting this process range from 100° C. to 250° C. or higher but below those at which substantial rupture or degradation of the polycarbonate molecules is encountered. At temperatures substantially in excess of 250° C., the polycarbonate tends to rupture and form lower molecular weight materials or possibly to regenerate reactants. Thus, temperatures no greater than about 200° C. are normally recommended. Temperatures of 140° C. to 200° C. are most frequently used. If particular precautions are exercised to minimize or avoid the rupture of the polycarbonates, temperatures over 200° C. are useful. One technique which permits temperatures above 250° C. involves shortening the reaction period to less than 2 hours. Degradation of the polycarbonate molecule is not encountered to the substantial degree that it occurs under more prolonged heating at these temperatures.

The reaction has been found to favorably proceed with high yields of polycarbonate, e.g. substantial conversions of the carbon dioxide and ethylene oxide, with reaction periods ranging from 4 to 24 hours. Longer or shorter reaction periods still will provide product.

The following examples are illustrative of the manner in which this invention may be performed:

EXAMPLE I

Charged to a reaction vessel were 44 grams (1.0 mole) of ethylene oxide and 11 grams (0.25 mole) of carbon dioxide (as Dry Ice). Five grams (0.033 mole) of triethylene glycol and 0.1 gram of potassium carbonate were included in the vessel. Thereafter the vessel was sealed and heated to 155° C. An initial pressure in the vessel of 550 pounds per square inch gauge was established at the reaction temperature. Heating continued for 6 hours when the pressure was essentially constant.

The contents were removed, fractionaed by vacuum distillation and 53.0 grams of polycarbonate were recovered. The polycarbonate was an amber, waxy solid having a 76 hydroxyl number and a molecular weight of about 1500.

EXAMPLE II

Charged to a reactor were 46.4 grams (1.05 moles) of ethylene oxide, 21.0 grams (0.478 mole) of gaseous carbon dioxide, 0.5 gram of potassium carbonate and 4.8 grams (0.032 mole) of triethylene glycol. This mixture was heated to 150° for 18 hours. At the outset, the pressure was 1000 pounds per square inch gauge at 150° C. After the reaction was completed, the pressure was 120 pounds per square inch gauge.

A crude product weighing 67.8 was recovered. Of this 41.7 grams were low viscosity, amber colored polycarbonate of 80 hydroxyl number and about 1400 molecular weight. The polycarbonate had a $CO_2$ content of 12.7 percent by weight. Also in the crude was 24.9 grams of ethylene carbonate.

EXAMPLE III

Example II is duplicated using in lieu triethylene glycol 0.032 mole of piperazine. There is thus obtained a high molecular weight polycarbonate.

EXAMPLE IV

A mixture of 45.4 grams (1.03 moles) of ethylene oxide, 18.5 grams (0.42 mole) gaseous carbon dioxide and 4.8 grams (0.032 mole) of triethylene glycol was heated in a closed reaction vessel to 150° C. for 16.5 hours, 180° C. for 4 hours and 200° C. for 24 hours. At the start when the temperature of the mixture first reached 150° C., the pressure in the vessel was 1200 pounds per square inch gauge. When the reaction was concluded, the pressure in the vessel was 290 pounds per square inch gauge.

A crude product weighing 44.7 grams was recovered. Of this, 30.0 grams were ethylene carbonate and 12.5 grams of amber colored, viscous appearing polycarbonate of 169 hydroxyl number, about 700 molecular weight, and 12.4 weight percent $CO_2$ content.

EXAMPLE V

A mixture of 43.8 grams (1.0 mole) of ethylene oxide, 19.2 grams (0.437 mole) of carbon dioxide, 0.5 gram of methyl morpholine and 5.0 grams (0.033 mole) of triethylene glycol was heated to 150° C. in a closed reaction vessel for 3 hours. An initial pressure of 200 pounds per square inch gauge was established in the reactor. This dropped to 20 pounds per ssquare inch gauge at the end of the 3 hours.

After separation by vacuum fractional distillation, 38.0 grams of product polycarbonate of 105 hydroxyl number and about 1100 molecular weight was recovered. This was dark and of low viscosity. It had a 13.0 weight percent $CO_2$ content.

EXAMPLE VI

A mixture of 49.0 grams (1.11 moles) of ethylene oxide, 11.9 grams (0.27 mole) carbon dioxide, 0.1 gram of methyl morpholine and 5.0 grams (0.033 mole) of triethylene glycol was heated to 150° C. for 16 hours in a closed reaction vessel. At the outset a pressure of 720 pounds per square inch gauge was developed. This dropped to 200 pounds per square inch gauge at the end of the reaction period.

A total of 28.9 grams of polycarbonate having a 108 hydroxyl number, a molecular weight of about 1100 and a $CO_2$ content of 12.2 percent by weight was recovered by vacuum fractionation. The polycarbonate was amber colored and viscous. Some 17.3 grams of ethylene carbonate were separated from the crude reaction product during this fractionation.

EXAMPLE VII

A mixture of 50.5 grams (1.15 moles) of ethylene oxide, 12.0 grams (0.273 mole) carbon dioxide, 0.5 gram of triethylamine and 5.0 grams (0.033 mole) of triethylene glycol were heated to 150° C. in a closed reaction vessel for 4 hours. A pressure initially of 620 pounds per square inch gauge was developed in the vessel. At the end of the reaction, the pressure was essentially atmospheric.

A yield of 18.3 grams of polycarbonate of 141 hydroxyl number, having a molecular weight of about 800 and a $CO_2$ content of 12.9 weight percent was obtained. The polycarbonate was an amber colored quite viscous liquid. Some 18.1 grams of ethylene carbonate were also separated from the crude reaction mixture.

EXAMPLE VIII

A mixture including 45.3 grams (1.03 moles) of ethylene oxide, 21.8 grams (0.496 mole) of carbon dioxide, 0.1 gram of potassium carbonate and 4.8 grams (0.032 mole) of triethylene glycol was heated for 3 hours at 200° C. in a closed vessel. Initially the pressure was 1395 pounds per square inch gauge; at the end of the reaction, it was 70 pounds per square inch gauge.

After vacuum fractional distillation, recovered were 36.6 grams of polycarbonate having a hydroxyl number of 81, an average molecular weight of 1400, and containing 12.9 weight percent $CO_2$.

EXAMPLE IX

A mixture of 43.9 grams (0.998 mole) of ethylene oxide, 15.5 grams (0.352 mole) of carbon dioxide, 0.1 gram of potassium carbonate and 4.8 grams (0.032 mole) of triethylene glycol was heated for 21 hours at 175° C. in a closed vessel. Initially, pressure was 1100 pounds per square inch gauge; at the end, the pressure was 300 pounds per square inch gauge.

After fractional vacuum distillation, 46.6 grams of polycarbonate was obtained having a hydroxyl number of 77, a molecular weight of about 1450 and containing 11.89 weight percent $CO_2$. Some 9.8 grams of ethylene carbonate were also recovered.

EXAMPLE X

A mixture of 45.6 grams (1.04 moles) of ethylene oxide, 23.7 grams (0.538 moles) of carbon dioxide, 0.1 gram of $Na_3PO_4.12H_2O$ and 4.8 grams (0.032 mole) of triethylene glycol was heated at 200° C. for 23 hours in a closed reaction vessel. The pressure declined to 100 pounds per square inch gauge from the initial 1250 pounds per square inch gauge present.

Some 39.4 grams of polycarbonate of 83 hydroxyl number, 1350 approximate molecular weight and containing 12.7 weight percent $CO_2$ were recovered.

EXAMPLE XI

A mixture of 45.0 grams (1.02 mole) of ethylene oxide, 33.6 grams (0.763 mole) of carbon dioxide, 0.01 gram potassium carbonate and 4.8 grams (0.032 mole) triethylene glycol was heated for 24 hours at 200° C. in a closed reaction vessel. The pressure was initially 1850 pound per square inch gauge and at the end was 125 pounds per square inch gauge.

Recovered were 25.8 grams of polycarbonate having a 114 hydroxyl number, an approximate molecular weight of 980 and containing 15.5 weight percent $CO_2$.

EXAMPLE XII

Some 720 grams (16.4 moles) of ethylene oxide, 482.4 grams (11 moles) of carbon dioxide, 1.6 grams of potassium carbonate and 80 grams (0.533 mole) of triethylene glycol were heated slowly in a bomb to 150° C. for 1 hour. Thereafter, the temperature was increased in 10° C. steps up to 185° C., and finally to 240° C. A total reaction period of 27 hours above 150° C. was employed. The maximum bomb pressure was 1950 pounds per square inch gauge.

A total of 846 grams of polycarbonate was obtained having an 104 hydroxyl number, an approximate molecular weight of 1080 and containing 11.6 weight percent.

EXAMPLE XIII

Example X is duplicated using 0.032 mole of 1,2 ethanedithiol in lieu of the triethylene glycol. A high molecular weight polycarbonate is obtained.

EXAMPLE XIV

Example V is duplicated using 0.033 mole of piperazine in lieu of the triethylene glycol. A high molecular weight polycarbonate (about 1100 molecular weight) is obtained.

Base catalysts are advisedly used to facilitate the reaction, although polycarbonates may be formed without catalysts. Any of the catalysts classified by the art as base catalysts are suitable. Illustrative base catalysts include inorganic bases such as alkali carbonates, to wit, potassium carbonate, sodium carbonate, calcium carbonate and magnesium carbonate; alkali hydroxides such as sodium hydroxide, potassium hydroxide and calcium hydroxide and alkali bicarbonates such as sodium bicarbonate. Other inorganic base alkaline catalysts include trisodium phosphate. Organic base catalysts including the tertiary amines such as the tertiary aliphatic amines typified by trimethyl amine, triethyl amine and triporpyl amine function. Heterocyclic tertiary amines such as methylmorpholine and pyridine also promote the reaction.

Catalytic concentrations of base catalyst vary depending on many factors including the activity of the catalyst, temperature and pressure of reaction and the like. Between 0.01 and 2.0 percent catalyst by weight of the reactants is usually adequate. Somewhat lower catalyst concentrations also promote the reaction whilst catalyst concentrations of 5 to 10 weight percent are not usually of added advantage.

Essential to copolymeriaztion of carbon dioxide and 1,2 epoxide in the formation of 700 to 5000 molecular weight polycarbonates is the presence of 0.01 to 0.20 mole, and preferably 0.02 to 0.1 mole of an organic compound having 2 or more active hydrogens, notably a polyhydric alcohol per mole of 1,2 epoxide. The polyhydric alcohol or organic compound apparently is the chemical instrumentality by which copolymerization is achieved.

Most prominent among the useful polyhydric alcohols are the dihydric alcohols or diols such as glycol or polyglycols. Dihydric alcohols of the structure HO—R—OH wherein R is an alkylene radical or a polyether group such as dimethylene glycol, ethylene glycol, diethylene glycol, triethylene glycol, propylene glycol and diproylene gycol are particularly suitable. Other dihydric alcohols of less than 10 carbon atoms and no more than 4 ether linkages are included. Polyhydric alcohols including triols (trihydric alcohols) such as glycerol, more preferably trimethylolethane and trimethylolpropane as well as tetrols (tetrahydric alcohols) including pentaerithrytol may be used, although these polyhydric alcohols favor cross-linking and hence their use is recommended for the most part only when three-dimensional polycarbonates are desired. Also cycloaliphatic diols such as 1,3 dihydroxy cyclopentane and aromatic dihydroxy compounds such as catechol, bisphenols and the xylene glycols are useful.

Polyhydric alcohols in the prescribed concentrations herein required are preferably added to the system as such. However, they may be formed in situ, e.g. formed in the presence of reactants from components which yield polyhydric alcohols. For example, a small quantity of water may be included in the reaction medium to generate a dihydric alcohol from the 1,2 epoxide.

Besides polyhydric alcohols, other organic compounds having at least 2 active hydrogens usually from 2 to 4 active hydrogens are of use. By active hydrogen is meant a hydrogen linked directly to a nitrogen, sulfur or oxygen atom such as is found in hydroxyl, non-tertiary amino, mercapto, carbamate and carboxyl groups. Each active hydrogen as herein intended is linked to a different nitrogen, sulfur or oxygen atom in the compound.

Thus, other organic compounds besides polyhydric alcohols are of use. Polyamines, especially diamines in which the amino groups are primary or secondary including ethylene diamine, trimethylene diamine, tetramethylene diamine, pentamethylene diamine, hexamethylene diamine and the like are suitable organics containing 2 active hydrogens. Piperazine and like polyamines wherein each of the nitrogens have but one hydrogen linked thereto (secondary amino nitrogens) are preferred. Also valuable are the mercaptans such as 1,2 ethanedithiol and others which correspond to the enumerated polyhydric alcohols. Alkylol amines such as ethanolamine and diethanolamine are illustrative of organics having 2 or more active hydrogens contributed by hydrogens linked to different atoms, e.g. nitrogen and oxygen. Thus, organic compounds having at least 2 active hydrogens by virtue of a combination of amino, mercapto, carboxyl or hydroxyl groups are included.

The amount of polyhydric alcohol or other organic having 2 or more active hydrogens employed may be varied within the herein specified range as the primary means for controlling the molecular weight of the polycarbonate product within the broader range of 700 to 5000. Usually, the polycarbonates of highest molecular weight result when about 0.02 to 0.05 mole of polyhydric alcohol per mole of 1,2 epoxide are used. The lower molecular weight polycarbonates are realized using from 0.08 to 0.10 mole of polyhydric alcohol per mole of 1,2 epoxide.

Polycarbonates having terminal hydroxyl groups and molecular weights averaging from 700 to 5000 are readily prepared according to this process with acylic 1,2 epoxides such as the alkylene oxides, ethylene oxide, propylene oxide or like olefinically saturated aliphatic 1,2 epoxides of up to (and including) 5 carbon atoms. By 1,2 epoxide a compound having a reactive

group is intended. Such compounds are often referred to as oxiranes. Olefinically unsaturated 1,2 epoxides such as butadiene monoepoxide can be reacted with carbon dioxide to prepare linear polycarbonates in the prescribed manner in which case the polymeric product contains olefinic unsaturation. Precence of olefinic unsaturation in 1,2 epoxides often requires the exercise of care that polymerization due to the olefinic unsaturation be minimized or avoided lest the unsaturated 1,2 epoxide homopolymerize competitively or in lieu of reaction with carbon dioxide. Other 1,2 epoxides include cyclohexene monoepoxide, 4-vinyl cyclohexene monoxide, 4-vinyl cyclohexene dioxide and butadiene diepoxide.

It is possible to employ more than one aliphatic 1,2 epoxide. Ethylene oxide functions with particular ease and hence is preferred. For certain purposes, more randomness in the linear polycarbonate molecule adds desirous properties. To accomplish this, two or more different 1,2 epoxides, e.g. a mixture of ethylene oxide and propylene oxide, may be used. Ethylene oxide preferably comprises the major 1,2 epoxide component. Mixtures, by way of example, of ethylene oxide and propylene oxide wherein the ethylene oxide comprises from 55 to 95 percent ethylene oxide by weight are especially valuable.

Ethylene carbonate, or like five-ring membered alkylene cyclic carbonates such as vinyl ethylene carbonate, depending upon the 1,2 epoxide used, may comprise a substantial component of the reaction mixture along with the polycarbonate. As already pointed out, ethylene oxide or like cyclic carbonate may be recycled for further use. Simple vacuum distillation will usually permit removal of cyclic carbonate from the polycarbonate.

High molecular weight polycarbonate products prepared by copolymeriaztion of carbon dioxide and 1,2 epoxides are not believed to be comprised of a single polycarbonate. Instead, the reaction product polycarbonates are believed to be a composition including polycarbonates of differing molecular weights.

Carbon dioxide, either as a gas, liquid or as Dry Ice, may be charged to the reaction system.

Polycarbonates having terminal hydroxyl groups and molecular weights of 700 to 5000 produced hereby are useful for many purposes. By virtue of their reactive terminal hydroxyl groups, they may be reacted with polycarboxylic acids such as phthalic, maleic, succinic, fumaric and adipic among others to obtain alkyd type resins which are useful as laminating resins, molding resins, coating compositions for metals, wood and woven fibrous products such as silk, cotton, wool and rayon.

These polycarbonates are reactive with isocyanates yielding urethanes. When reacted with a diisocyanate, such as toluene diisocyanates, polyurethane products result which are rubbery in character and serve as substitutes for other synthetic rubbers and natural rubbers. Reaction with diisocyanates in the presence of small quantities of water provides foams, either flexible or rigid, depending upon the presence or absence of a cross-linking agent during the urethane formation. A cross-linking agent such as a trihydroxy material like glycerol gives rigidity to the foam. These foams are suitable for insulating purposes in aircraft, as crash pads, as upholstery cushions, and for many other purposes that require either rigid or elastic foams.

Although the present invention has been described by reference to specific details of certain embodiments, it is not intended that the invention be construed as limited thereto except insofar as such details are found in the appended claims.

What is claimed is:
1. A method of preparing high molecular weight polycarbonate which comprises subjecting a mixture of an alkylene 1,2-epoxide of up to 5 carbon atoms and carbon dioxide containing 0.01 to 0.2 mole of a dihydric alcohol of the formula HO—R—OH wherein R is selected from the group consisting of alkylene and polyalkylene ether radicals having up to 10 carbon atoms and no more than 4 ether linkages per mole of epoxide to a temperature above 100° C. but below that at which substantial rupture of polycarbonate occurs and superatmospheric pressure whereby to copolymerize carbon dioxide and the 1,2 epoxide and form high molecular weight polycarbonate.

2. The method of claim 1 wherein the temperature is between 100° C. and 250° C. and the pressure is at least 200 pounds per square inch gauge.

3. The method of claim 1 wherein the epoxide is ethylene oxide and the dihydric alcohol is ethylene glycol.

4. The method of claim 1 wherein a small amount of water is included in the mixture to provide dihydric alcohol in situ.

5. A method of preparing high molecular weight polycarbonate which comprises subjecting in the presence of a base catalyst a mixture of 1 to 6 moles of an alkylene 1,2 epoxide of up to 5 carbon atoms per mole of carbon dioxide containing 0.01 to 0.2 mole of a dihydric alcohol of the formula HO—R—OH wherein R is selected from the group consisting of alkylene and polyalkylene ether radicals having up to 10 carbon atoms and not more than 4 ether linkages per mole of 1,2 epoxide to a temperature between 100° C. and 250 C. and superatmospheric pressure in excess of 200 pounds per square inch gauge thereby copolymerizing the carbon dioxide and 1,2 epoxide and forming polycarbonate of 700 to 5,000 molecular weight.

6. The method of claim 5 wherein the dihydric alcohol is a triethylene glycol.

7. A method of preparing high molecular weight polycarbonate which comprises subjecting to a temperature above 100° C. but below that at which substantial rupture of polycarbonate occurs and superatmospheric pressure a mixture of an alkylene 1,2-epoxide of up to 5 carbon atoms and carbon dioxide containing 0.01 to 0.2 mole of an organic compound having 2 active hydrogens selected from the group consisting of dihydric alcohols of the formula HO—R—OH wherein R is a radical selected from the group consisting of alkylene and polyalkylene ether radicals which contain up to 10 carbon atoms and no more than 4 ether linkages, dithiols corresponding to said dihydric alcohols and alkylene diamines of 2 to 6 carbon atoms per mole of the epoxide whereby to copolymerize carbon dioxide and the 1,2-epoxide and form high molecular weight polycarbonate.

8. The method of claim 7 wherein the organic compound having 2 active hydrogens is ethanedithiol.

9. The method of claim 7 wherein the organic compound having 2 active hydrogens is piperazine.

10. A method of preparing high molecular weight polycarbonate by copolymerization of carbon dioxide and ethylene oxide which comprises subjecting in the presence of a base catalyst a mixture of carbon dioxide and ethylene oxide containing 0.01 to 0.2 mole of a dihydric alcohol of the formula HO—R—OH wherein R is selected from the group consisting of alkylene and polyalkylene ether radicals containing up to 10 carbon atoms and not more than 4 ether linkages per mole of ethylene oxide to a temperature of 100° C. to 250 C. and superatmospheric pressure of 200 to 5,000 pounds per square inch.

References Cited by the Examiner
UNITED STATES PATENTS 2,210,817  8/1940  Peterson _____ 260—463 X
2,449,987  9/1948  Gresham _____ 260—463 X

FOREIGN PATENTS 740,366  9/1943  Germany.
950,603  10/1956  Germany.

CHARLES B. PARKER, *Primary Examiner.*